United States Patent
Kakida et al.

[11] Patent Number: 5,297,483
[45] Date of Patent: Mar. 29, 1994

[54] WORK CONVEYOR

[75] Inventors: Takuya Kakida, Kurashiki; Noriyuki Inoue, Asakuchi; Shoichi Okada, Kurashiki; Yoshiki Nakamura, Kurashiki; Wakaharu Ikeda, Kurashiki; Akira Mikami, Kurashiki; Akiyoshi Kimura, Kurashiki; Masayuki Aihara, Kurashiki; Hisashi Fujiwara, Tamano; Yuji Watanabe, Kojima, all of Japan

[73] Assignee: Mitsubishi Jidosha Kogyo Kabushiki Kaisha, Tokyo, Japan

[21] Appl. No.: 966,755

[22] Filed: Oct. 28, 1992

[51] Int. Cl.⁵ .............................. B61J 1/00
[52] U.S. Cl. ....................... 104/88; 104/102; 104/129; 414/618; 414/619; 29/824
[58] Field of Search ........... 104/88, 102, 129, 96; 29/771, 786, 822, 823, 824; 198/418.1, 468.8, 468.6; 414/618, 619

[56] References Cited

U.S. PATENT DOCUMENTS

| | | | |
|---|---|---|---|
| 2,969,750 | 1/1961 | Clark | 198/468.6 |
| 4,685,208 | 8/1987 | Sekiraku | 29/786 |
| 4,766,547 | 8/1988 | Modery et al. | 104/88 |
| 5,007,522 | 4/1991 | Focke et al. | 198/468.8 |
| 5,119,732 | 6/1992 | Lisy | 104/88 |
| 5,236,156 | 8/1993 | Zimmermann | 104/88 |

FOREIGN PATENT DOCUMENTS 9209686 10/1992 Fed. Rep. of Germany .
2176445 12/1985 United Kingdom .

OTHER PUBLICATIONS

Fördern und Heben, vol. 22, No. 7, May 1972, pp. 386-389, "Synchronisierte Montagestrassen".

Primary Examiner—Mark T. Le
Attorney, Agent, or Firm—Wegner, Cantor, Mueller & Player

[57] ABSTRACT

Left side panels and right side panel are produced in a left side panel production line and a right side panel production line, respectively By vertical lifters, each left side panel and each right side panel are lifted at the delivery stations and then transferred to runners at work transfer positions. The runner with the left side panel held thereon travels along a rail while the runner with the right side panel held thereon travels along a rail. Both runners are stopped at a standby position and then conveyed to a runner transfer position simultaneously. The runners with the left and right side panels held thereon, respectively, are loaded on the traverser and then conveyed to a drop lifter arranged above a main body assembly line. The left and right side panels are transferred to the drop lifter. The drop lifter then descends and feeds the left and right side panels simultaneously on opposite sides of a floor panel in the main body assembly line.

11 Claims, 11 Drawing Sheets

WORK CONVEYOR

BACKGROUND OF THE INVENTION

Field of the Invention

This invention relates to a work conveyor for feeding-panel components to a vehicle body assembly line or the like, for example, from a panel component production line, in which panel components for various portions of each vehicle body are produced, in a main vehicle body assembly line in which the panel components are assembled into a vehicle body by welding, and especially to a work conveyor useful as an apparatus for simultaneously feeding a left side panel and a right side panel in combination to the main vehicle body assembly line at a predetermined position.

Description of the Related Art

To assemble a vehicle body in a vehicle body assembly line, various panel components are fed in succession to a floor panel conveyor line and are welded on each floor panel as a base to assemble the vehicle body. In this case, vehicle body components, especially those assembled in combination as a left component and a right component, for example, side panels are simultaneously fed in combination as a left side panel and a right side panel to predetermined locations of the floor panel and are welded on the floor panel.

For this purpose, conventional vehicle body assembly lines have generally adopted the line configuration shown in FIG. 11.

According to the conventional art, left and right side panels 2a,2b to be fed to a main body assembly line ML, in which floor panels 5 are conveyed, are transported through different routes to feed positions arranged on both sides of the main body assembly line ML as will be described hereinafter.

Each left side panel 2a is assembled in a left side panel production line LL and the left side panel 2a so completed is conveyed on a pallet (not shown) from a last step L8 of the left side panel production line LL to a storage S1 which serves as a component storage area. A predetermined number of left side panels 2a are stored there. In synchronization with the production cycle of the main body assembly line ML as a next step, a worker feeds by a forklift truck the leading left side panel 2a, which has been stored in the storage S1 and is mounted on the pallet, to a left side panel feed position P1 arranged alongside the main body assembly line ML. Symbols L1-L8 shown along the left side panel production line LL designate work stations for various production steps.

Like the left side panels 2a described above, each right side panel 2b produced in a right side panel production line RL is conveyed on a pallet (not shown) from a last step R8 of the left side panel production line RL to a storage S2. The leading right side panel 2b is fed by the worker from the storage S2 to a right side panel feed position P2 arranged alongside the main body assembly line ML. Symbols R1-R8 shown along the right side panel production line RL designate work stations for various production steps.

In unison with the timing of conveyance of the floor panel 5 conveyed along the main body assembly line ML, the left and right side panels 2a,2b fed to the left and right side panel feed positions P1,P2 arranged on both sides of the main body assembly line ML are held by unillustrated feed means and then fed to the main body assembly line ML at positions adjacent to the floor panel 5.

The adoption of such a conventional line configuration as described above is accompanied by the following inconvenience:

(1) It is necessary to simultaneously feed the left side panel 2a and the right side panel 2b in combination to both sides of the floor panel 5 in synchronization with the cycle of conveyance of the main body assembly line ML. To meet this, the conventional line configuration therefore adopts a line construction such that a predetermined number of side and right side panels 2a,2b are produced in advance than the floor panels 5 and stored in the storages S1,S2. It is therefore necessary to include the work to unload the side panels 2a,2b, which have been produced in the respective side panel production lines LL,RL, from the corresponding lines LL,RL and then to load them on pallets, the work to convey the pallets to predetermined positions in the storages S1,S2, and the work to feed the side panels 2a,2b from the storage S1,S2 to the side body feed positions P1,P2, respectively. These works are generally conducted by workers and are difficult to be automated. Automation of the movements of side panels 2a,2b, said movements having been conducted by workers, without modification of the line construction requires extremely expensive facilities, leading to difficulties in actually adopting such automated feeding.

(2) It is necessary to arrange the storages S1,S2 for the side panels 2a,2b on a floor of a plant because the side panels 2a,2b are conveyed in and out by workers. Where there is a limitation to the size of the plant, inconvenience is encountered that the space of the plant cannot be used effectively. When there is a limitation to the space of a plant, the left side panel production line LL and the right side panel production line RL cannot be arranged in the same plant buildings as the main body assembly line ML but are arranged in different plant buildings, respectively. Work is needed to convey panel components from buildings for the left side panel production line LL and the right side panel production line RL to the plant building of the main body assembling line ML, resulting in an increased number of work steps.

(3) To produce many types of vehicle bodies by the conventional line configuration, the storages S1,S2 are obviously required to store plural types of panel components and to feed the panel component, which is of a type required in the next step, to the main body assembly line ML. These requirements increase the worker's load and extremely impairs the working efficiency.

SUMMARY OF THE INVENTION

With a view toward overcoming the above-described inconvenience of the conventional work conveyors, the present invention has the following objects:

(1) Firstly, to provide a work conveyor which permits by a simple construction full automation of efficient feeding of panel components from a panel component production line to an assembly line in which various panel components fed therein are assembled.

(2) Secondly, to provide a work conveyor which allows to eliminate storages arranged on the floor of a conventional plant to store panel components therein, thereby permitting efficient utilization of the space in the plant.

(3) Thirdly to provide a work conveyor which can be readily applied to an assembly line in which a wide variety of a vehicle bodies are produced.

In one aspect of the present invention, there is thus provided a work conveyor for successively transporting components to a main body assembly line in which vehicle bodies are assembled one after another. The work conveyor comprises:

- a vertical lifter for upwardly transporting each component from a receiving position, where the vertical lifter receives the component, to a delivery position arranged above the receiving position for delivering the component;
- conveyor means having a conveyor rail, which is formed in a loop and includes a cut-off portion formed by cutting itself off at least at a portion thereof, and a plurality of runners arranged movably on the conveyor rail, each of said runners having a hanger disposed thereon to receive one of the components from the vertical lifter;
- control means electrically connected to the respective runners for outputting running control signals to each of the runners so that the runner is stopped at least at a work transfer position, where the runner receives one of the components from the vertical lifter, and at a standby position arranged before the cut-off portion;
- a traverser having a transport rail disposed extending from the cut-off portion to a position above the main body assembly line, a traverser main body provided movably along the transport rail, and a connecting rail disposed on the traverser main body and, when the traverser main body is located at the cut-off portion, connected substantially with the conveyor rail to receive the runner from the conveyor rail; and
- a drop lifter arranged below the traverser for receiving the component from the runner, which has been transported by the traverser, and lowering and feeding the component.

In another aspect of the present invention, there is also provided a work conveyor for successively transporting panel components, which are used as panel components for vehicle bodies, to a main body assembly line (ML) in which the vehicle bodies are assembled one after another. The work conveyor comprises:

- a panel component conveyor connecting together a plurality of work stations arranged along a panel component production line, in which the panel components are produced, to transport panel components worked at each of the work stations toward a downstream side of the panel component production line;
- a vertical lifter for upwardly transporting each panel component from a receiving position, where the vertical lifter receives the panel component, to a delivery position arranged above the receiving position for delivering the panel component;
- a trolley conveyor having a conveyor rail, which is formed in a loop, includes a cut-off portion formed by cutting itself off at least at a portion thereof and has plural types of insulated trolley lines, and a plurality of runners arranged on the conveyor rail and movable upon receipt of the electric signals from the trolley lines, each of said runners having a hanger disposed thereon and provided with arms closable to hold one of the panel components transported to the delivery position by the vertical lifter;
- control means connected to the trolley lines of the trolley conveyor for outputting running control signals to each of the runners so that the runner is stopped at least at a work transfer position, where the runner receives one of the panel components from the vertical lifter, and at a standby position arranged before the cut-off portion;
- a traverser having a transport rail disposed extending from the cut-off portion to a position above the main body assembly line, a traverser main body provided movably along the transport rail, and a connecting rail disposed on the traverser main body and, when the traverser main body is located at the cut-off portion, connected substantially with the conveyor rail to receive the runner from the conveyor rail; and
- a drop lifter arranged below the traverser for receiving the panel component from the runner, which has been transported by the traverser, and lowering and feeding the body component to the main body assembly line.

In a further aspect of the present invention, there is also provided a work conveyor for simultaneously transporting a left panel component and a right panel component in combination from corresponding two panel component production lines, in which two types of panel components used as left and right panel components for vehicle bodies are produced respectively, to a predetermined position in a main body assembly line in which various vehicle body components fed thereto are assembled into vehicle bodies. The work conveyor comprises:

- two panel component conveyors arranged in the respective panel component production lines and connecting together plural work stations arranged along the individual panel component production lines, whereby a panel component worked at each of the work stations in each of the panel component production lines is conveyed to the next work station on a downstream side of the panel component production line;
- two vertical lifters disposed adjacent to the respective panel component conveyors and vertically reciprocal between receiving positions, where the vertical lifters receive the panel components from the corresponding panel component conveyors, and delivery positions arranged above the receiving positions to deliver the panel components;
- a trolley conveyor having conveyor rails extending in parallel combination, each of said conveyor rails being formed in a loop, including a cut-off portion formed by cutting itself off at least at a portion thereof and having plural types of insulated trolley lines; and a plurality of runners arranged on each of the conveyor rails and movable upon receipt of the electric signals from the trolley lines, each of said runners having a hanger disposed thereon and provided with arms closable to hold the panel component transported to the corresponding delivery position by the associated vertical lifter;
- ground control means connected to the trolley lines of the paired conveyor rails in the trolley conveyor for outputting running control signals so that the runners are stopped at least at corresponding transfer positions, where the runners receive the left and right panel components from the associated vertical lifters, and at a single standby position arranged before both of the cut-off portions and each runners running on the corresponding conveyor rails are caused to run and stop following the runners running ahead of said each runners;

a traverser having transport rails disposed extending from the cut-off portions to positions above the main body assembly line, respectively, traverser main bodies provided movably along the transport rails, respectively, and connecting rails disposed on the respective traverser main bodies and, when the traverser main bodies are located at the corresponding cutoff portions, connected substantially with the corresponding conveyor rails to receive the associated runners from the corresponding conveyor rails; and a drop lifter arranged below the traverser and adjacent to the main body line for simultaneously receiving the panel components from the runner, which have been transported by the traverser, and lowering and feeding the body components to a predetermined position in the main body assembly line.

The present invention has overcome the above-described inconvenience of the conventional work conveyors and has achieved the objects of the present invention.

BRIEF DESCRIPTION OF THE DRAWINGS

The above and other objects, features and advantages of the present invention will become apparent from the following description and the appended claims, taken in conjunction with the accompanying drawings, in which:

DETAILED DESCRIPTION OF THE INVENTION AND PREFERRED EMBODIMENT

Figure 11:
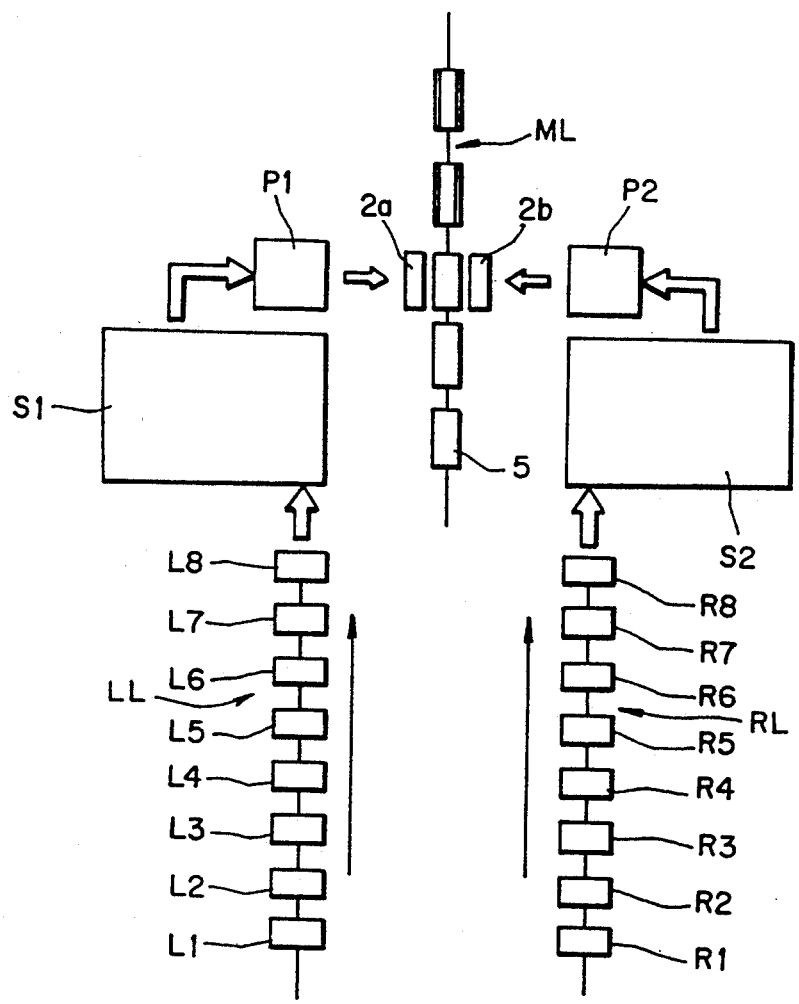
FIG. 11 is a schematic plan view of the conventional work conveyor.

One embodiment of the present invention will hereinafter be described with reference to the accompanying drawings, in which elements of structure identical to their corresponding elements in the conventional work conveyor illustrated in FIG. 11 are designated by like reference numerals or symbols and their description is omitted herein.

Figure 1:
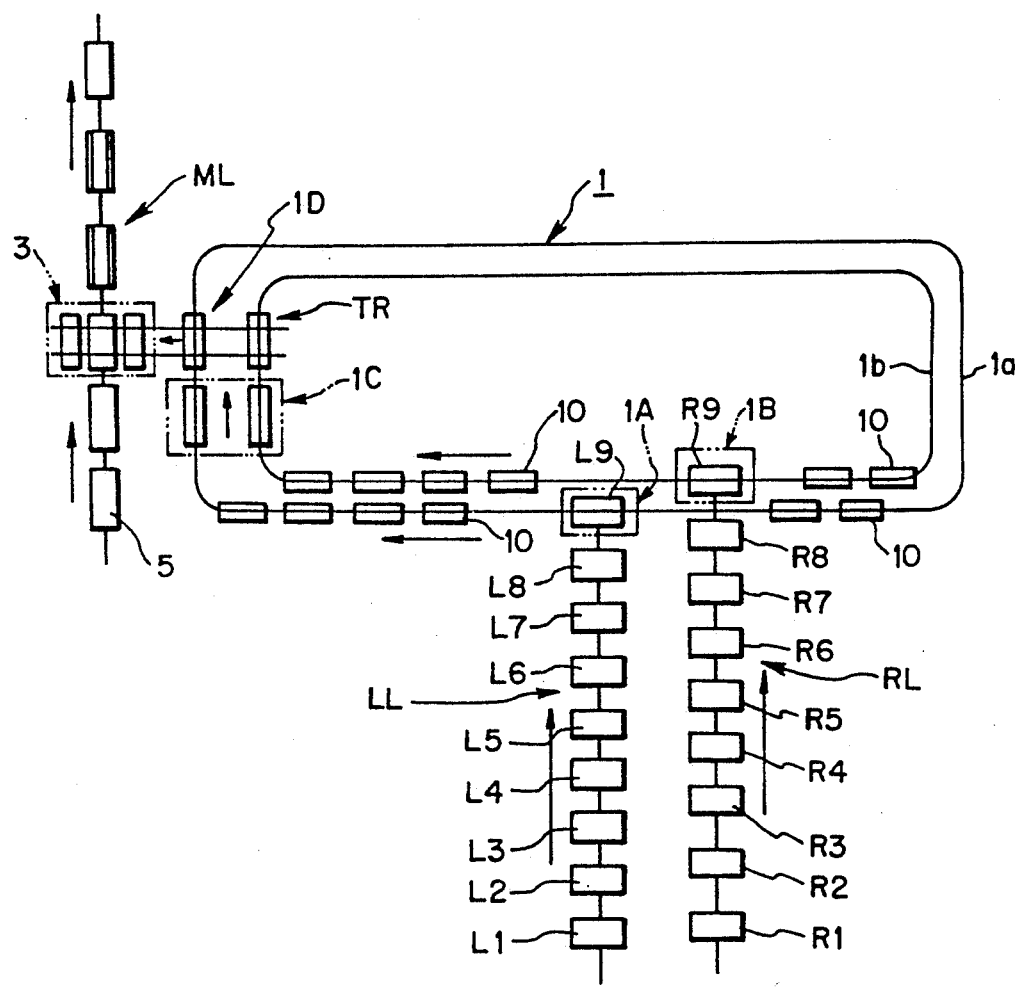
FIG. 1 is a schematic plan view of a work conveyor according to one embodiment of the present invention.
Figure 7:
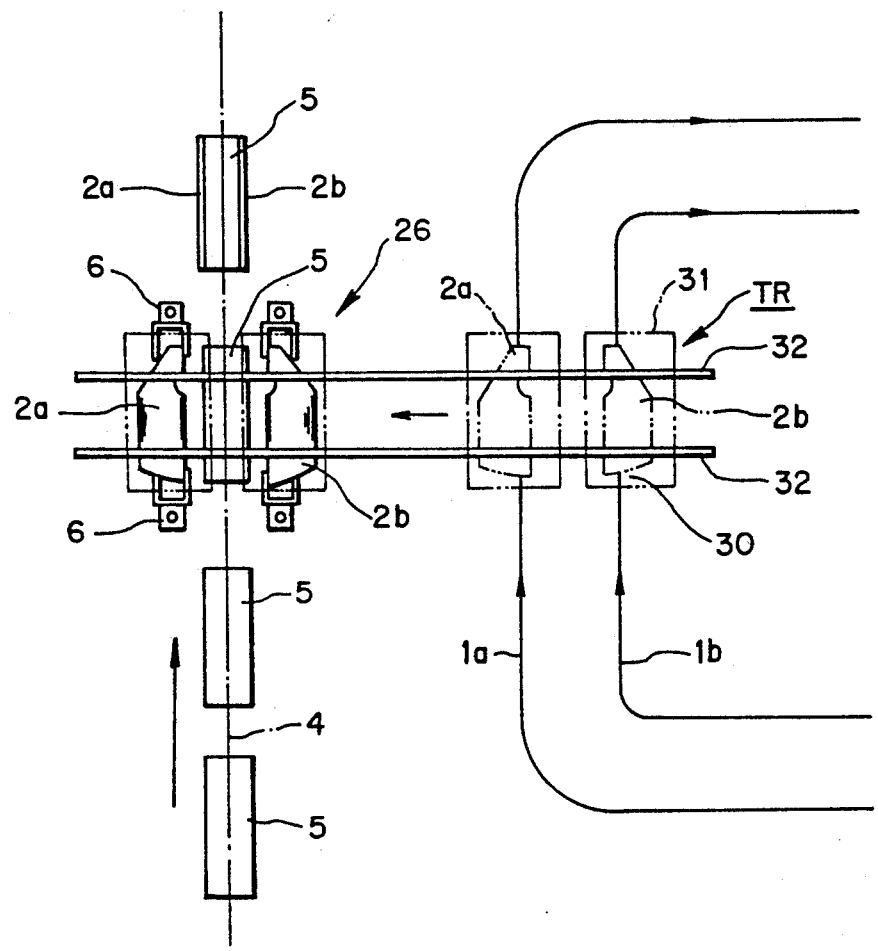
FIG. 7 is a plan view of a traverser in the work conveyor.

Referring first to FIG. 1, there are shown a left side panel production line LL arranged linearly on a floor F (see FIG. 2) of a plant to produce left side panels 2a (see FIG. 7). Designated at symbols L1-L8 are individual work stations, and symbol L9 indicates a delivery station arranged at a below-described work transfer position IA to deliver each work, i.e., left side panel which has been conveyed to the delivery station. Symbol RL, on the other hand, indicates a right side panel production line arranged in parallel with the left side panel production line LL to produce right side panels 2b (see FIG. 7.). Like the left side panel production line LL described above, the right side panel production line RL has work stations R1-R8 and a delivery station R9.

Figure 4:
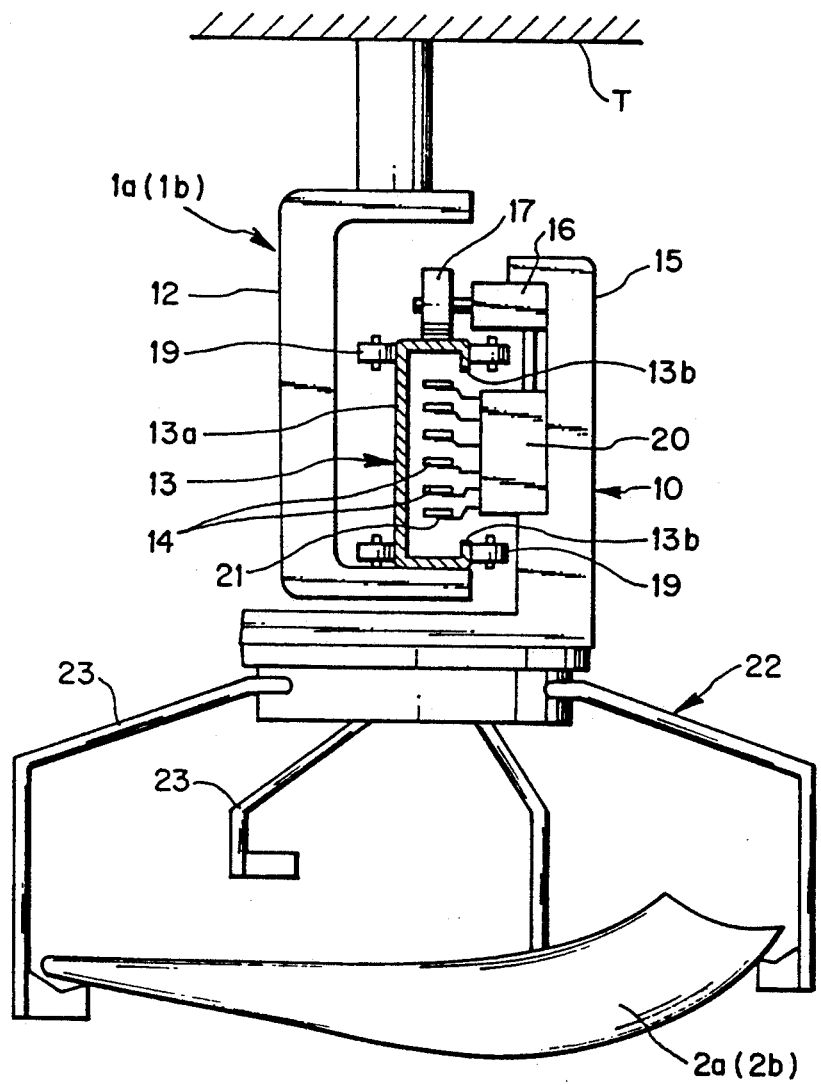
FIG. 4 is a front view of a runner in a trolley conveyor in the work conveyor.
Figure 5:
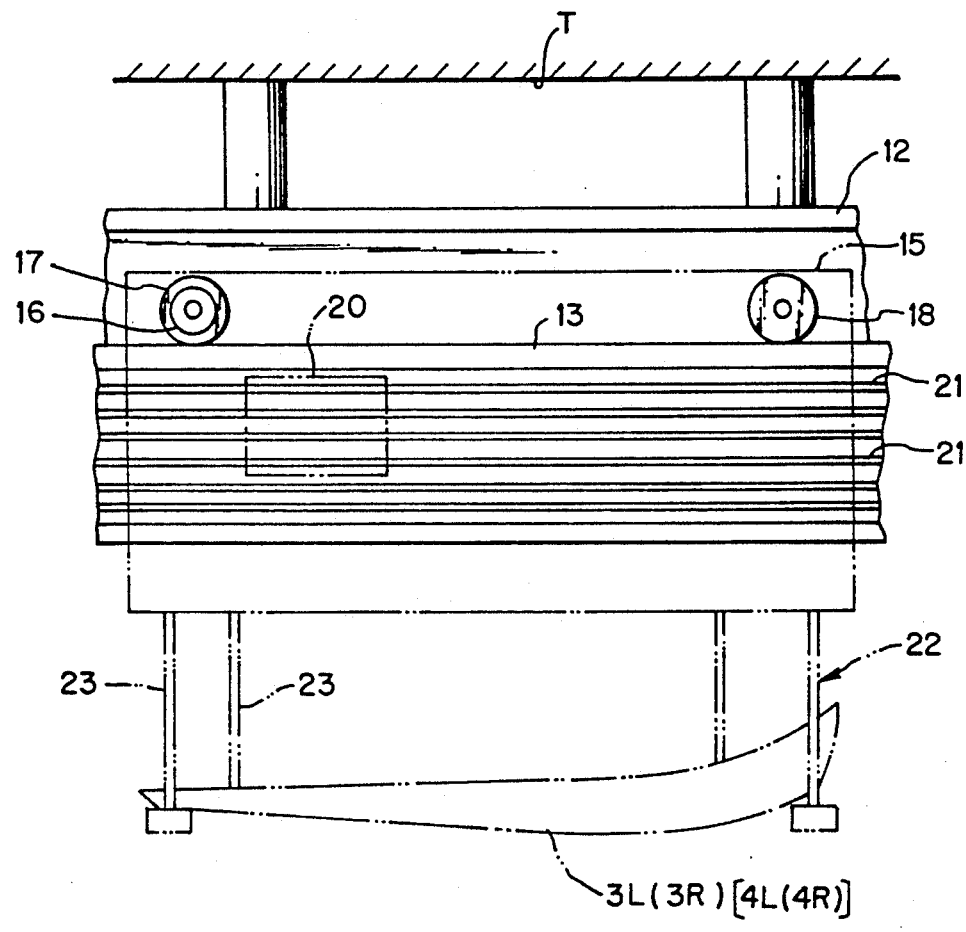
FIG. 5 is a side view of the runner in the trolley conveyor.

Designated at numeral 1 is a trolley conveyor. Symbols 1a, 1b indicate rails provided in combination at an elevated height to serve as conveyance paths for conveying different panel components, respectively. These rails 1a, 1b are formed substantially in a loop, and are arranged such that they extend through positions (i.e., the work transfer position 1A and a work transfer position 1B) above the delivery station L9 of the left side panel production line LL and the delivery station R9 of the right side panel production line RL and also pass through a runner transfer position 1D arranged adjacent to a below-described main body assembly line ML. The rails 1a, 1b are each provided with plural runners 10 which are constructed to run by itself upon receipt of power supply from power lines (see FIG. 4) provided on the corresponding rail 1a or 1b. The runners 10 are each provided with a hanger (see FIG. 4) to suspend a work therefrom. In each of the rails 1a, 1b, a running truck for the corresponding runners 10 is divided into plural sections so that running of each runner 10 is controlled via the rail 1a or 1b in the individual sections. Each runner 10 is controlled so that it stops at the work transfer positions 1A,1B and the runner transfer position 1D. It is also controlled to stop at a standby position 1C which is arranged before the runner transfer position 1D. Each runner 10 running through the sections of the corresponding rail 1a or 1b is also controlled in such a way that the runner 10 is allowed to run continuously when there is no other runner 10 in the section ahead of the section in which the first-mentioned runner 10 is running but is stopped in the section in which the runner 10 is running when there is another runner 10 in the section ahead of the current section.

Numeral 3 designates a drop lifter arranged at a side panel feed station where the left and right side panels 2a,2b are fed to the main body assembly line ML. The drop lifter 3 receives the left and right side panels 2a,2b, which have been conveyed at an elevated height, and lowers them to the main body assembly line ML provided on the floor F.

Indicated at symbol TR is a traverser provided extending between the runner transfer position 1, which is arranged at the rails 1a, 1b of the trolley conveyor 1, and the position above the main body assembly line ML. At this position, the drop lifter 3 is also arranged. The traverser TR receives the runners 10,10, which have been conveyed to the standby position 1C of the rails 1a, 1b of the trolley conveyor 1 and stopped there and hold the left and right side panels 2a,2b, respectively, with the left and right side panels 2a,2b still held by the corresponding runners 10,10; conveys the runners 10,10 to the position above the main body assembly line ML, namely, to the drop lifter 3; simultaneously transfer the left and side panels 1a, 1b in combination to the drop lifter 3; and then returns the runners 10,10 from the position of the drop lifter 3 to the positions of the rails 1a, 1b to allow the runners 10,10 to run again on the rails 1a, 1b, respectively.

The drop lifter 3, which has received the left and right side panels 2a,2b in combination from the corresponding runners 10,10, descends to the level of the main body assembly line ML and feeds the left and right side panels 2a,2b to opposite sides of a floor panel 5 conveyed in the main body assembly line ML. The left and right side panels 2a,2b fed to the opposite sides of the floor panel 5 are then raised in directions perpendicular to the floor panel 5 and, in states held in the specified positions, are conveyed to the next step for their assembly by welding.

The elements of structure in the above-described conveyor will hereinafter be described element by element in detail.

The left side panel production line LL and the right side panel production line RL will now be described with reference to FIGS. 1 and 2.

Since both the side panel production lines LL,RL are substantially of the same construction, only one of the production lines, namely, only the right side panel production line RL will be described.

As is illustrated in FIG. 1, the right side panel production line RL is composed of plural work stations R1-R9 arranged at the same intervals on a straight line. At the individual work stations, R1-R9, parts which make up the right side panel 2b are successively assembled by unillustrated industrial robots on a right side panel main body in accordance with an assembling method such as welding. The conveyance of each work, i.e., assembly through the individual work stations is conducted by a shuttle conveyor 11 which extends from the first work station R1 to the delivery station R9 arranged at the work transfer position 1B. This shuttle conveyor 11 is provided, as depicted in FIG. 2, with horizontal guide rails 112 which support on their upper surfaces pallets 111 movably in the direction of conveyance of each work, so that the pallets 111 can move on the horizontal guide rails 112. The pallets 111 located at the individual work stations R1-R8 are conveyed to the next stations at the same time by the shuttle conveyor 11 which is designed to reciprocate at a conveyance stroke set equal to a distance ST between each two adjacent work stations. Each pallet 111 is provided with plural locators 11a which support the right side panel 2b as a work in a prescribed position. Each pallet 111 which has been conveyed to the last work station R9 is again returned to the first work station R1 by an unillustrated conveyor means.

Figure 2:
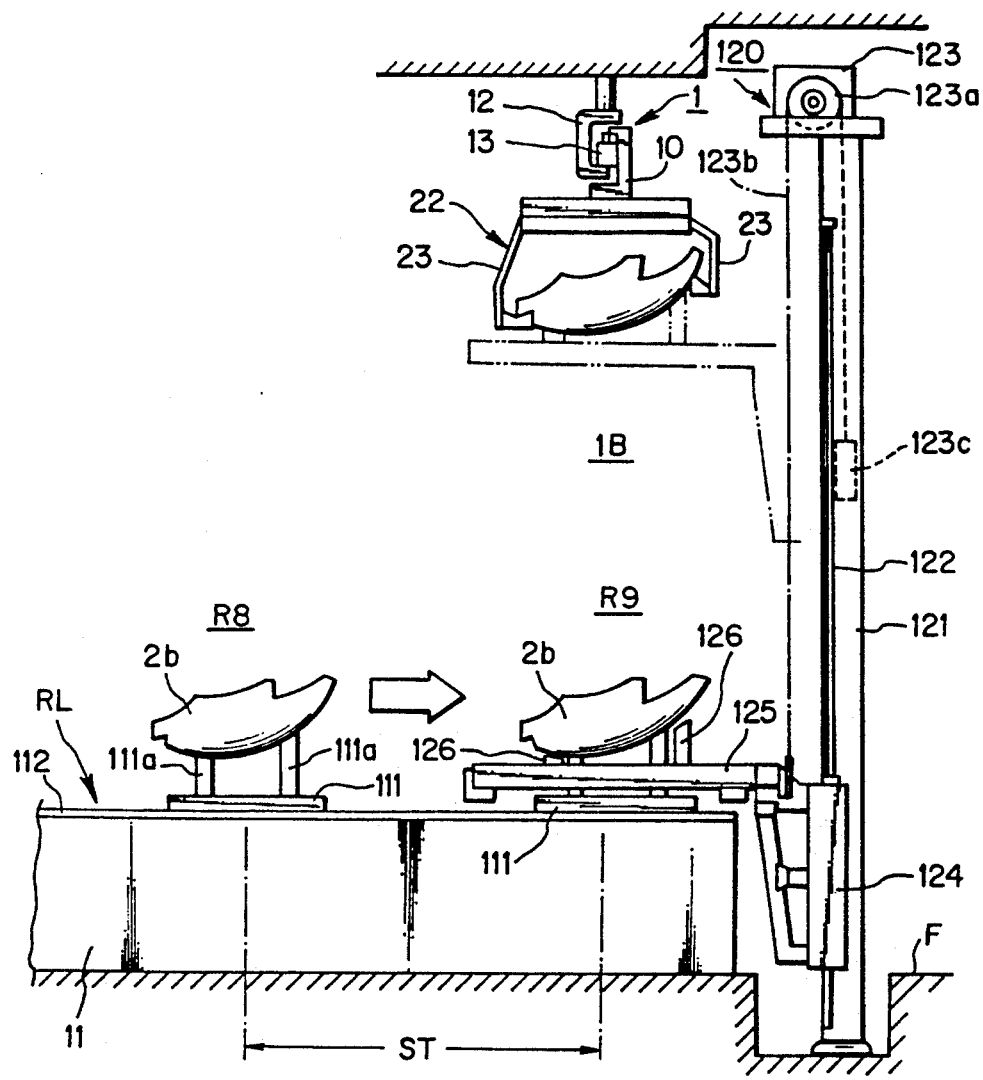
FIG. 2 is a side view of a shuttle conveyor and a vertical lifter in the work conveyor.
Figure 3:
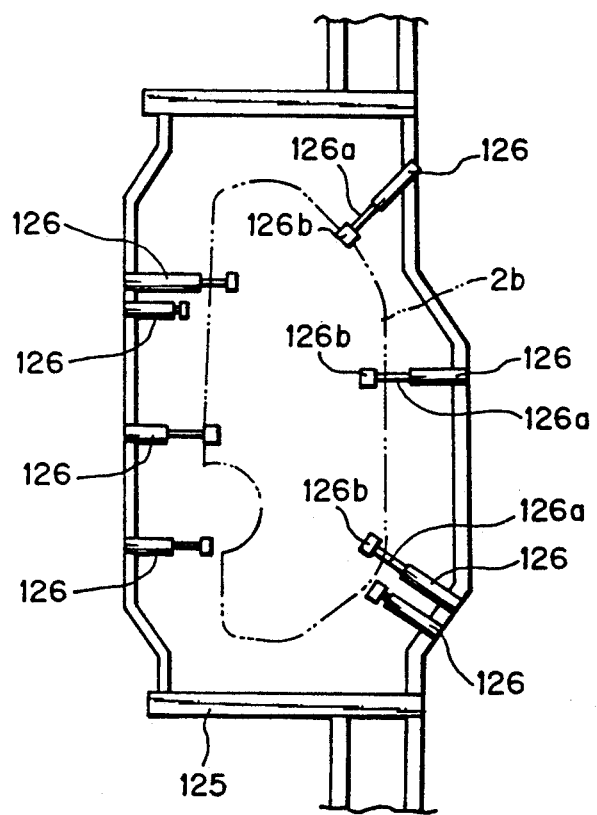
FIG. 3 is a plan view of a movable frame in the vertical lifter.

Referring to FIGS. 2 and 3, a description will next be made of a lifter 120 which transfers the right side panel 2b as a work from the shuttle conveyor 11 in the right side panel production line RL to the trolley conveyor 1.

The lifter 120 comprises two columns 121 provided side by side on the floor F in a direction extending at a right angle relative to the direction of conveyance of each work in the right side panel production line RL; a vertical guide rail 122 provided along the columns 121; a lift member 124 provided for vertical movement along the posts 121 while being guided by the guide rail 122; a movable frame 125 horizontally extending from the lift member 124 toward the shuttle conveyor 11 in the right side panel production line RL; plural cylinders 126 arranged on the movable frame 125 and having rods 126a extendible toward an interior space of the frame 125; locators 126b provided at free ends of the individual rods 126a for holding the right side panel 2b as a work in a prescribed position; and a lifting means 123 disposed on upper end portions of the columns 121 and provided with a sprocket 123a which carries and drives a chain 123b connected at one end thereof to the lift member 124 and at an opposite end thereof to a weight 123c disposed between the columns 121. The plural cylinders 126 are controlled depending on the kind of each work and are hence applicable to a wide variety of works. The locator 126b of each cylinder 126 is constructed movably between an operated position, where the locator 126b supports the right side panel 2b, and a non-operated position where the locator 126b is retreated from the work. The lift member 124 is movable up and down by the lifting means 123 between a lower position, namely, the work receiving position where the lift member 124 receives the right side panel 2b from the shuttle conveyor 11 and an upper position, namely, the work transfer position where the lift member 124 transfers the right side panel 2b to the trolley conveyor 1.

The lifter for transferring each left side panel 2a from the left side panel production line to the trolley conveyor 1 is of the same construction as the above-described lifter 120, so that its description is omitted herein.

The trolley conveyor 1 will next be described with reference to FIGS. 1 and 4-6. A description will first be made of the rails 1a, 1b.

Figure 6:
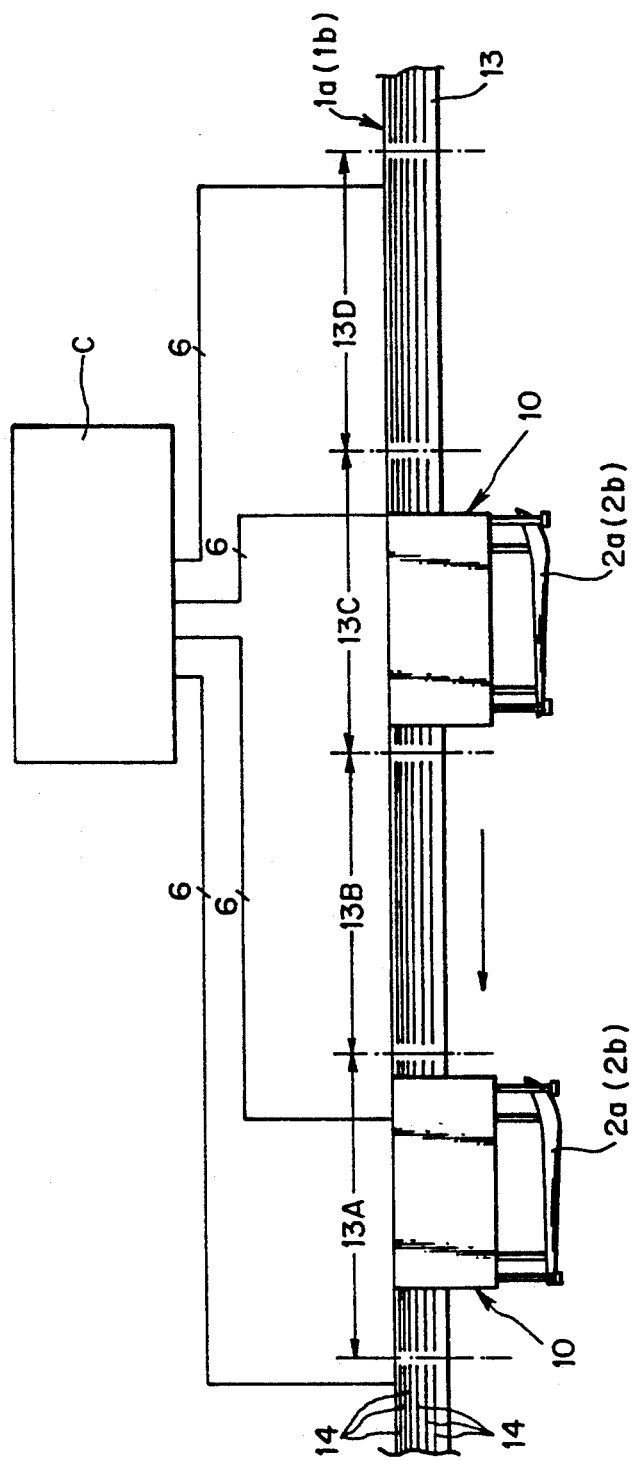
FIG. 6 is a block diagram illustrating a control technique for the trolley conveyor.

The rails 1a, 1b are each constructed of a turned square U-shaped, stationary frame 12, a rail main body 13 disposed inside the turned square U-shaped, stationary frame 12, and plural insulated trolley lines 14 arranged longitudinally within the rail main body 13. The rail main body 13 has a rear wall 13a and bent walls 13b,13b, all of which form vertical surfaces, respectively, and a top wall which presents a horizontal surface. Each runner 10 is provided with a drive roller 17, a driven roller 18 and plural guide rollers 19 as will be described subsequently herein. The drive roller 17 and the driven roller 18 roll on the horizontal top wall, while the guide rollers 19 rolls on the rear wall 13a and the bent walls 13b,13b. The insulated trolley lines 14 are composed of three power lines, one ground line and two control lines. The six insulated trolley lines 14 which are provided as a unit are divided into sections 13A,13B,13C,13D, . . . set over predetermined lengths along the length of the rail main body 13 as shown in FIG. 6, so that they become independent from one section to another. The insulated trolley lines 14 provided in the individual sections are connected to a ground control panel C arranged on the floor F. A description will next be made of each runner 10.

Numeral 15 indicates a housing of the runner 10. A motor 16 is secured on an upper front part of the casing 15 as viewed in the advancing direction. The drive roller 17 is mounted on a drive shaft of the motor 16 and is maintained in rolling contact with the upper wall of the rail main body 13. The driven roller 1B, on the other hand, is secured on an upper rear part of the casing 15 as viewed in the advancing direction such that the driven roller 18 is also maintained in rolling contact with the upper wall of the rail main body 13. The plural guide rollers 19 are rotatably supported on the housing 15 at positions adjacent to the drive roller 17 and the driven roller 18. These guide rollers 19 are maintained in rolling contact with the rear wall 13a and bent walls 13b,13b of the rail main body 13 so that, while the runner 10 is moving by itself along the rain main body 13, the guide rollers 19 hold the rain main body 13 from both left and right sides to prevent the runner 10 from shaking or meandering during running.

A control unit 20 is also mounted on the housing 15. This control unit 20 is provided with brushes 21 which are maintained in sliding contact with the individual lines of the six insulated trolley lines 14, whereby electric power supplied from the ground control panel C is fed to the control unit 20 of the runner 10 and motor drive signals sent from the ground control panel C are introduced into the control unit 20.

The housing 15 is also provided with a hanger 22. This hanger 22 is formed of plural turnable arms 23. For example, left and right side panels 3L,3R of a car family A as well as left and right side panels 4L,4R of another car family B can be both held in a horizontal position by selectively turning the arms 23 (see FIG. 5).

Next, control of the running of each runner 10 will be described with reference to FIG. 6.

As has been described above, the rail main body 13 is divided into the plural sections 13A,13B,13C,3D, ... in accordance with the insulated trolley lines 14. Where the runner 10 is present in one of the sections, for example, in the section 13A, a signal indicating the presence of the runner 10 in the Section 13A is outputted to the ground control panel C via the control lines upon contact of the brushes 21 of the runner 10 with the power lines of the insulated trolley lines 14 arranged in the section 13A. As a result, the ground control panel C stops output of a running command signal, which commands running of another runner 10, to the control lines of the insulated trolley lines 14 in the section 13B which is located behind the section 13A. Owing to this construction, the runner 10 positioned in the section D which is on the right-hand side in FIG. 6, namely, on the rear side as viewed in the advancing direction, is allowed to advance to the section 13B by a running command signal inputted to the section 13C from the ground control panel C because no runner 10 is present in the section 13B ahead of the section 13C. By a signal from the section 13A, the runner 10 is then stopped in the section 13B.

As is understood from the foregoing, the trolley conveyor 1 is constructed to have plural runners 10 run along the rails 1a, 1b while checking the state of the front parts of the rails 1a, 1b as viewed in the advancing direction, namely, while confirming the existence of other runners in the advancing direction.

The above-described trolley conveyor 1 is arranged, as is illustrated in FIG. 1, to permit conveyance of the left and right side panels 2a,2b, which are different works from each other, to the corresponding rails 1a, 1b arranged in combination and substantially in parallel. The runners 10 which run on the respective rails 1a, 1b are controlled to stop, in the running paths formed by the rails 1a, 1b, at the work transfer positions 1A,1B, where the runners 10 receive the corresponding works from the left and right side panel production lines LL,RL, respectively, and at the standby position 1D where the runners 10 wait for their loading on the traverser 31.

The traverser TR will next be described with reference to FIGS. 7-10.

Referring first to FIG. 7, symbols 1a, 1b indicate the rails arranged in combination at an elevated height as illustrated in FIG. 1. At portions of the respective rails where the rails approach the main body assembly line ML and extend in parallel with the main body assembly line ML, the rail main bodies 13,13 are cut off to form cut-off portions 30,30.

Figure 8:
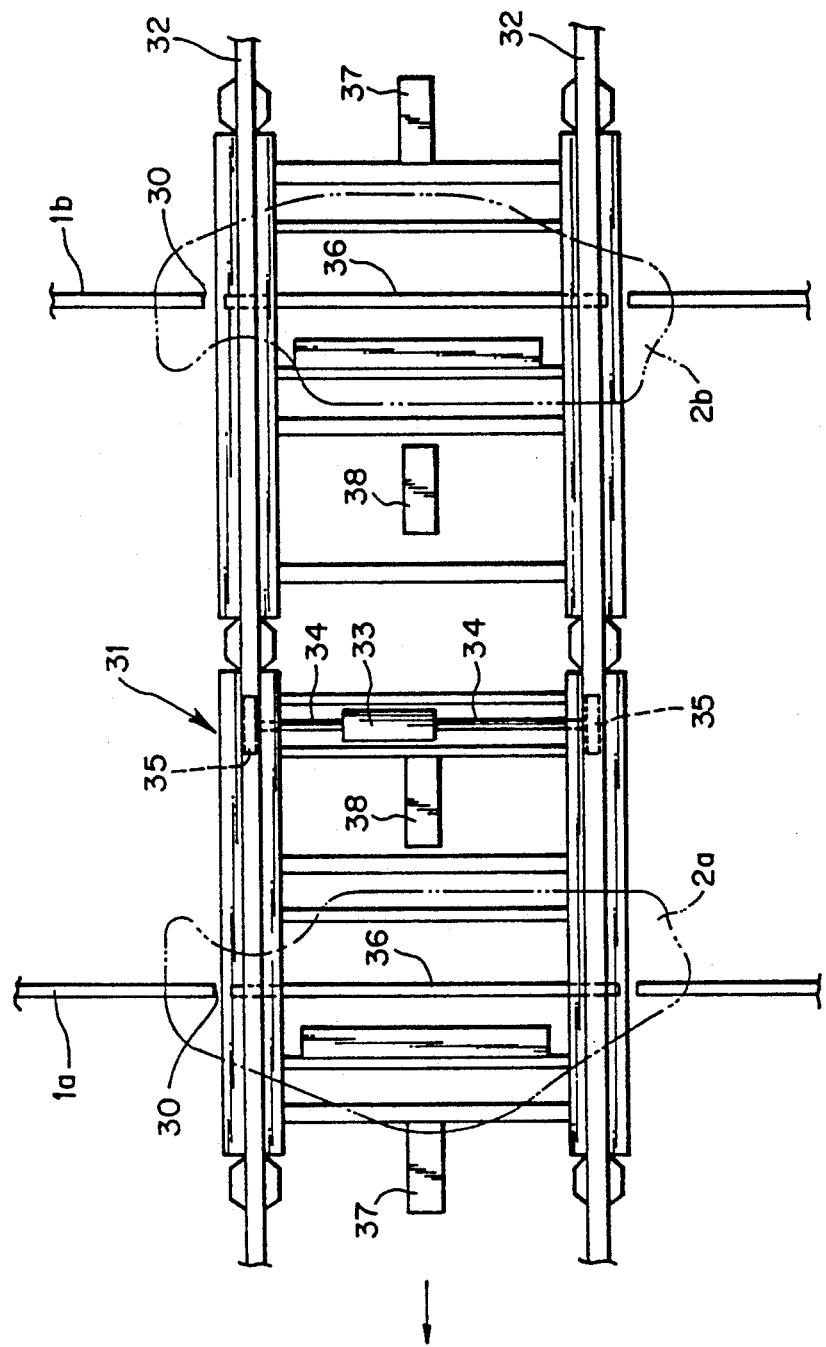
FIG. 8 is an enlarged, fragmentary, plan view of the traverser.
Figure 9:
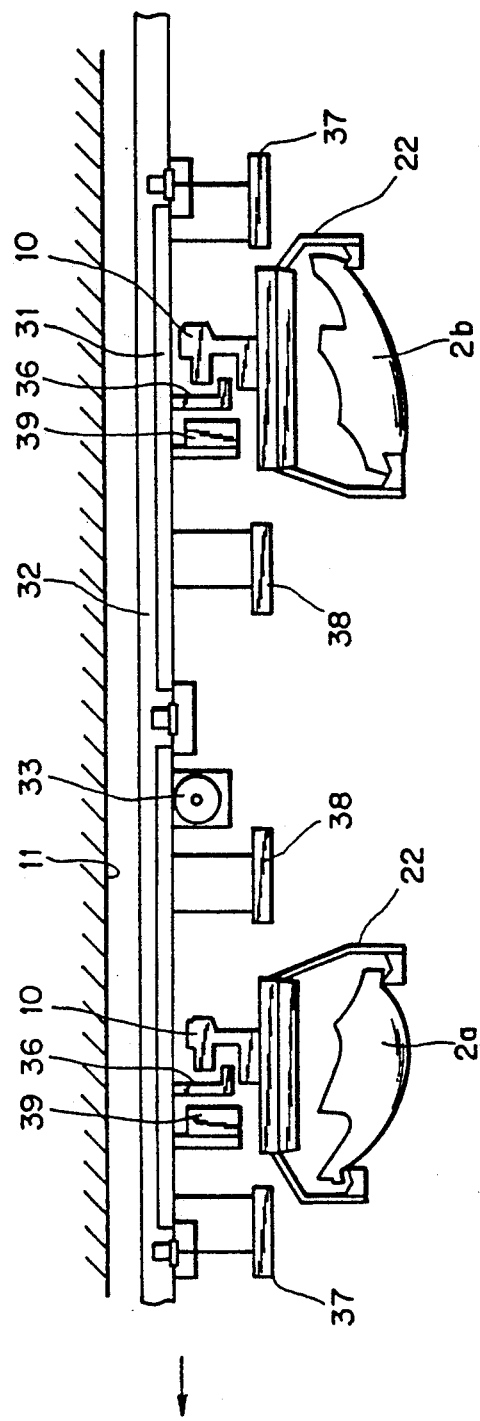
FIG. 9 is an enlarged, fragmentary, side view of the traverser.
Figure 10:
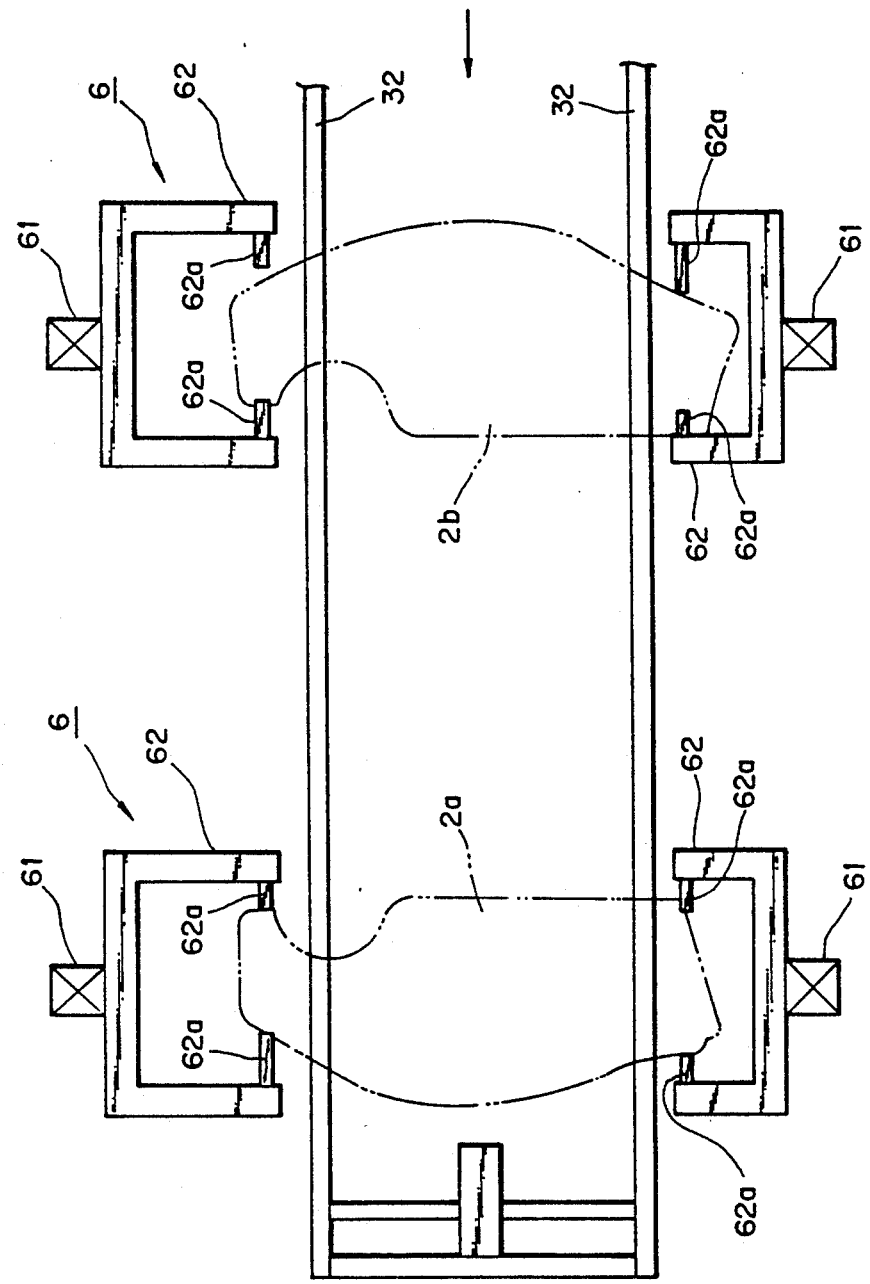
FIG. 10 is a plan view of a drop lifter in the work conveyor.

At the cut-off portions 30,30, the traverser TR is provided as depicted in FIGS. 8-10. The cut-off portions 30,30 are provided with a pair of straight rails 32,32 which extend at right angles relative to the rails 1a, 1b. The straight rails 32,32 are provided above the rail main bodies 13,13 of the rails 1a, 1b. One ends of the straight rails 32,32 are located in the cut-off portions 30,30 of the rails 1a, 1b whereas the other ends extend to the position above the main body assembly line ML.

A traverser main body 31 of the under hung type is reciprocally supported on the straight rails 32,32. A reversible motor 33 is provided centrally on the traverser main body 31. Drive shafts 34,34 of the motor 33 are provided with drive rollers 35,35 which roll on the straight rails 32,32, respectively, whereby the traverser main body 31 is reciprocated by the drive rollers 35,35 along the straight rails 32,32.

Attached to a lower side of the traverser main body 31 are a pair of connecting rails 36,36 arranged at the same interval as the rail main bodies 13,13 of the rails 1a,1b provided in combination in the above-described trolley conveyor 1. These connecting rails 36,36 serve to connect the rails 1a, 1b at the cut-off portions 30,30, respectively. The drive rollers 17 of the runners 10,10, which run by themselves along their corresponding rail main bodies 13,13, run along the connecting rails 36,36 in the cut-off portions 30,30, respectively. The connecting rails 36,36 have a similar construction to the rail main bodies 13,13 of the above-described trolley conveyor 1, namely, are each provided internally with six insulated trolley lines (not shown) electrically connected to the ground control panel C.

On the lower side of the traverser main body 31, there are also provided hanger closing mechanisms 37,37, hanger opening mechanisms 39,39 and hanger locking mechanisms 39,39 in opposition to the hangers 22,22, respectively.

As has been described above, the traverser TR is constructed to load the runners 10,10, which have been conveyed to the cut-off portions 30,30 by the trolley conveyor 1, on the connecting rails 36,36 together with the side panels 2a,2b held by the runners 10,10 and then to convey the runners 10,10 with the side panels 2a,2a still held thereby to the position above the main body assembly line ML.

With reference to FIG. 10, a description will next be made of a drop lifter 6 disposed at a transfer position 26 where the left and right side panels 2a,2b are transferred from the above-described traverser TR to the work conveyor 4 (see FIG. 7) arranged in the main body line ML.

The drop lifter 6 is constructed of two posts 61,61 provided on one side of the main body assembly line ML, two posts 61,61 arranged on the other side of the main body assembly line ML, elevator members 62,62,62,62 provided for vertical movement along the respective posts 61,61,61,61, and work receivers 62a,62a, ... attached to and extending from free end portions of the individual elevator members 62,62,62, 62. In the drop lifter 6, the elevator members 62,62, 62,62 are arranged for vertical movement between an upper position, where the elevator members 62,62,62,62 receive the works, i.e., the left and right side panels 2a,2b simultaneously from the traverser TR. and a lower position where the elevator members 62,62,62,62 transfer the left and right side panels 2a,2b simultaneously to the work conveyor 4 in the main body assembly line ML arranged on the floor F.

Operation of the work conveyor constructed as described above will next be described.

The left side panel 2a and the right side panel 2b are produced in the different production lines, namely, in the left side panel production line LL and the right side panel production line RL, respectively. In the each of the lines LL,RL, say, in the right side panel production line RL, works, namely, assemblies are successively conveyed to the downstream-side work stations R2-R9 from one station to the next at the predetermined conveyance stroke ST and are progressively formed into the right side panels 2b by unillustrated industrial robots disposed at the respective work stations R1-R9. The left and right side panels 2a,2b completed as described above are conveyed to and stopped at the delivery stations L9,R9 which are arranged as the last stations of the respective side panel production lines LL,RL at the work transfer positions 1A,1B depicted in FIG. 1.

Next, the respective side panel 2a,2b are transferred to the trolley conveyor 1 from the last stations L9,R9 by the corresponding lifters 12,12. With reference to FIGS. 2 and 3, the transfer of the right side panel 2b will be described next.

Before the right side panel 2b is conveyed to the last station R9 in the right side panel production line RL, the corresponding runner 10 in the trolley conveyor 1 has advanced to the transfer position 1B, has stopped at the predetermined point in the transfer position 1B and has been on standby with the arms 23 thereof opened. By the lifting means 123, the associated lifter 12 causes the lift member 124 to downwardly move from the upper position (the position indicated by two-dot chain lines in FIG. 2) to the work receiving position at the lower position (the position indicated by solid lines in the same figure). At this time, the plural cylinders 126 provided on the movable frame 125 are all held at the non-operated positions. When the lift member 124 reaches the work receiving position, only the cylinders 126 corresponding to the type of the side panel 2b out of the cylinders 126 are actuated to drive the associated rods 126a to positions where the right side panel 2b can be supported by the locators 126b provided at the free end portions of the rods 126a. In this state, the lift member 124 is moved upwards and is stopped at the position where the arms of the runner 10 can hold the right side panel 2b. The arms 23 of the runner 10 are then closed to hold the right side panel 2b. The runner 10 has now received the right side panel 2b from the lifter 12.

At the above transfer position IA, each runner 10 with the right side panel 2b received from the lifter 12 receives a running command signal from the ground control panel C through the control line of the insulated trolley lines 14 provided on the rail main body 13, so that the runner 10 runs toward the standby position 1C forwardly ahead in the advancing direction. The running of the runner 10 is also controlled by a control signal sent via the ground control panel C from the section ahead of the section in which the runner 10 itself is present. In other words, the running of the runner 10 is controlled in such a way that the running 10 is allowed to run to the standby position 1C without stopping on the way when no other runner 10 is present in front of the runner 10 itself but, when another runner 10 is present in front of the runner 10 itself, is stopped in the section one section behind the section where said another runner 10 is located. For this purpose, the runners 10 each of which is holding the right side panel 2b are arranged from one section in a row on the rail 1b with the first runner 10 located in the standby position 1C while waiting for conveyance to the traverser TR. As is understood from the foregoing, the trolley conveyor 1 has not only the function to convey each right side panel 2b through the sections from the transfer position 1B to the standby position 1C but also the storage function to enable feeding of each right side panel 2b as a work to the next step in conformity with the production cycle time of the next step.

The conveyance of each left side panel 2a to the standby position 1C is exactly the same as the conveyance of the right side panel 2b described above, so that its description is omitted herein.

As is illustrated in FIG. 8, the left and right side panels 2a, 2b conveyed to the standby position 1C by the runners 10,10, which run along the rails 1a, 1b provided in combination, are loaded, in the state held on the runners 10,10, on the connecting rails 36,36 provided on the traverser main body 31 of the traverser TR and are then stopped on the connecting rails 36,36. While being driven by the motor 33 and guided along the straight rails 32,32, the traverser main body 31 then runs toward the main body assembly line ML and stops at the position above the main body assembly line ML.

When the elevator members 62,62,62,62 of the drop lifter 6 move upwardly in this state and stop at the positions where the left and right side panels 2a,2b can be received by the work receivers 62a,62a, . . . , the hanger opening mechanisms 38,38 provided on the traverser TR are actuated to open the arms 23 of the runners 10,10 so that the left and right side panels 2a,2b are transferred onto the corresponding work receivers 62,62a, . . . of the drop lifter 6. In synchronization with the timing of conveyance of the floor panel 5 in the main body assembly line ML, the elevator members 62,62,62,62 of the drop lifter 6 are driven downwardly to simultaneously feed the left and right side panels 2a,2b to the opposite sides of the floor panel 5.

In parallel with the operation to feed the left and right side panels 2a,2b to the main body assembly line ML, the traverser TR actuates the hanger closing mechanisms 37,37 subsequent to the transfer of the left and right side panels 2a,2b to the drop lifter 6 so that the arms 23 of the runners 10,10 located on the connecting rails 36,36 are brought into closed positions, respectively. Next, the traverser main body 31 moves along the straight rails 32,32 to the home positions on the rails 1a, 1b of the trolley conveyor 1, namely, to the runner transfer position 1D.

The runners 10,10, which are located on the connecting rails 36,36 of the traverser 31 without holding any work thereon, return to the corresponding rails 1a, 1b and are then driven toward the transfer positions 1A,1B to receive the next works, respectively.

According to the embodiment described above, the following advantageous effects can be obtained.

(1) The work conveyor can convey the left and right side panels 2a,2b from the left and right side panel productions lines LL,RL to the main body assembly line ML without the need for a worker, thereby contributing to the automation of a plant line.

(2) Owing to the adoption of the construction that the left and right side panels 2a,2b are conveyed from the left and right side panel production lines LL,RL to the position above the main body assembly line ML by the trolley conveyor 1 arranged at an elevated height in a plant, a space enabling the arrangement of one or more additional lines is obtained under the trolley conveyor 1 so that the space of a plant can be effectively used especially when there is the need to arrange many lines of various kinds in a small plant.

(3) In the trolley conveyor 1, the rail main bodies 13,13 on which the plural runners 10 run are electrically divided into plural sections in the direction of the lengths thereof. Running of the plural runners 10 which run along the corresponding rails 1a, 1b is controlled from the respective sections on the basis of signals corresponding to the positions of the runners 10. The trolley conveyor 1 is therefore provided not only with the function to convey works but also with the function to store works. It is therefore unnecessary to provide storages on the floor of a plant to exclusively store the left and right side panels 2a,2b temporarily. As a result of the omission of the exclusive storages, it is no longer necessary to convey and manage works by labors, thereby contributing to a reduction in the production cost.

(4) The left and right side panels 2a,2b produced in the left and right side panel production lines LL,RL are held by the runners 10 of the trolley conveyor 1 at the positions of the last stations L9,R9 of the left and right side panel production lines LL,RL via the respective lifters 12,12. The runners 10 with the left and right side panels 2a,2b held thereon can then be conveyed by the traverser TR to the position above the main body assembly line ML. In other words, when the left and right side panels 2a,2b as works are held by the runners 10 at the positions of the left and right side panel production lines LL,RL, the runners 10 themselves are caused to move across plural conveyor means without the need for mounting the runners 10 on other transporting means so that re-holding or re-mounting of the works is minimized. This has made it possible to provide a work conveyor which can perform sure conveyance or transportation without inconvenience such as dropping of works despite its simple construction.

(5) Even when plural kinds of vehicle bodies are produced, the adoption of the work conveyor according to the present invention makes it possible to produce such plural kinds of vehicle bodies in the same line provided that different types of panel components are conveyed in an order specified in accordance with a production plan.

What is claimed is:

1. A work conveyor for successively transporting components to a main body assembly line in which vehicle bodies are assembled one after another, comprising:

a vertical lifter for upwardly transporting each component from a receiving position, where the vertical lifter receives the component, to a delivery position arranged above the receiving position for delivering the component;

conveyor means having a conveyor rail, which is formed in a loop and includes a cut-off portion formed by cutting itself off at least at a portion thereof, and a plurality of runners arranged movably on the conveyor rail, each of said runners having a hanger disposed thereon to receive one of the components from the vertical lifter;

control means electrically connected to the respective runners for outputting running control signals to each of the runners so that the runner is stopped at least at a work transfer position, where the runner receives one of the components from the vertical lifter, and at a standby position arranged before the cut-off portion;

a traverser having a transport rail disposed extending from the cut-off portion to a position above the main body assembly line, a traverser main body provided movably along the transport rail, and a connecting rail disposed on the traverser main body and, when the traverser main body is located at the cut-off portion, connected substantially with the conveyor rail to receive the runner from the conveyor rail; and a drop lifter arranged below the traverser for receiving the component from the runner, which has been transported by the traverser, and lowering and feeding the component.

2. The work conveyor of claim 1, wherein the vertical lifter has a column supported at a lower end thereof on a floor and extending upwardly; a lift member disposed for vertical movement on the column; a movable frame provided on and extending from the lift member and defining in a horizontal plane a space corresponding in shape and dimensions to the components; and a plurality of cylinder means arranged on the movable frame so that each of said cylinder means is directed toward an interior of the space and can be driven between an operated position where said cylinder means supports the component and a non-operated position where said cylinder means is prevented from interfering with the component.

3. The work conveyor of claim 1, wherein:

the conveyor rail is constructed of a stationary frame secured on a structural ceiling member of a plant building, a rail main body provided on the stationary frame, and insulated trolley lines arranged longitudinally on the rail main body and including power lines for feeding electric power to each of the runners and control lines for transmitting the running control signal to the runner; and the insulated trolley lines are provided on the rail main body such that the insulated trolley lines are independent from one section to another arranged over predetermined lengths along the length of the rail main body.

4. A work conveyor for successively transporting panel components, which are used as panel components for vehicle bodies, to a main body assembly line in which the vehicle bodies are assembled one after another, comprising:

a panel component conveyor connecting together a plurality of work stations arranged along a panel component production line, in which the panel components are produced, to transport panel components worked at each of the work stations toward a downstream side of the panel component production line;

a vertical lifter for upwardly transporting each panel component from a receiving position, where the vertical lifter receives the panel component, to a delivery position arranged above the receiving position for delivering the panel component;

a trolley conveyor having a conveyor rail, which is formed in a loop, includes a cut-off portion formed by cutting itself off at least at a portion thereof and has plural types of insulated trolley lines, and a plurality of runners arranged on the conveyor rail and movable upon receipt of the electric signals from the trolley lines, each of said runners having a hanger disposed thereon and provided with arms closable to hold one of the panel components transported to the delivery position by the vertical lifter;

control means connected to the trolley lines of the trolley conveyor for outputting running control signals to each of the runners so that the runner is stopped at least at a work transfer position, where the runner receives one of the panel components from the vertical lifter, and at a standby position arranged before the cut-off portion;

a traverser having a transport rail disposed extending from the cut-off portion to a position above the main body assembly line, a traverser main body provided movably along the transport rail, and a connecting rail disposed on the traverser main body and, when the traverser main body is located at the cut-off portion, connected substantially with the conveyor rail to receive the runner from the conveyor rail; and a drop lifter arranged below the traverser for receiving the panel component from the runner, which has been transported by the traverser, and lowering and feeding the body component to the main body assembly line.

5. The work conveyor of claim 4, wherein the panel component conveyor in the panel component production line has a horizontal guide rail extending in a flowing direction of the panel component production line; a plurality of pallets movably supported on the horizontal guide rail, each of said pallets being provided with locators for mounting on the associated pallet each assembly produced in the panel component production line; and a shuttle member disposed in engagement with each of the pallets to successively move the pallet through plural work stations arranged in the panel component production line.

6. The work conveyor of claim 4, wherein the vertical lifter has a column supported at a lower end thereof on a floor and extending upwardly; a lift member disposed for vertical movement on the column; lifting means connected to the lift member and arranged on an upper end portion of the column for vertically moving the lift member; a movable frame provided on and extending from the lift member and defining in a horizontal plane thereof a space corresponding in shape and dimensions to the panel components; and a plurality of cylinder means arranged on the movable frame so that each of said cylinder means is directed toward an interior of the space and can be driven between an operated position where said cylinder means supports the panel component and a non-operated position where said cylinder means is prevented from interfering with the panel component.

7. The work conveyor of claim 4, wherein:

the conveyor rail of the trolley conveyor is constructed of a stationary frame secured on a structural ceiling member of a plant building, a rail main body provided on the stationary frame, and the plural insulated trolley lines arranged longitudinally on the rail main body, said insulated trolley lines including power lines for feeding electric power to each of the runners and control lines for transmitting the running control signals to each of the runners; and the insulated trolley lines are provided on the rail main body such that the insulated trolley lines are independent from one section to another arranged over predetermined lengths along the length of the rail main body.

8. A work conveyor for simultaneously transporting a left panel component and a right panel component in combination from corresponding two panel component production lines, in which two types of panel components used as left and right panel components for vehicle bodies are produced respectively, to a predetermined position in a main body assembly line in which various vehicle body components fed thereto are assembled into vehicle bodies, comprising:

two panel component conveyors arranged in the respective panel component production lines and connecting together plural work stations arranged along the individual panel component production lines, whereby a panel component worked at each of the work stations in each of the panel component production lines is conveyed to the next work station on a downstream side of the panel component production line;

two vertical lifters disposed adjacent to the respective panel component conveyors and vertically reciprocal between receiving positions, where the vertical lifters receive the panel components from the corresponding panel component conveyors, and delivery positions arranged above the receiving positions to deliver the panel components;

a trolley conveyor having conveyor rails extending in parallel combination, each of said conveyor rails being formed in a loop, including a cut-off portion formed by cutting itself off at least at a portion thereof and having plural types of insulated trolley lines; and a plurality of runners arranged on each of the conveyor rails and movable upon receipt of the electric signals from the trolley lines, each of said runners having a hanger disposed thereon and provided with arms closable to hold the panel component transported to the corresponding delivery position by the associated vertical lifter;

ground control means connected to the trolley lines of the paired conveyor rails in the trolley conveyor for outputting running control signals so that the runners are stopped at least at corresponding transfer positions, where the runners receive the left and right panel components from the associated vertical lifters, and at a single standby position arranged before both of the cut-off portions and each runners running on the corresponding conveyor rails are caused to run and stop following the runners running ahead of said each runners;

a traverser having transport rails disposed extending from the cut-off portions to positions above the main body assembly line, respectively, traverser main bodies provided movably along the transport rails, respectively, and connecting rails disposed on the respective traverser main bodies and, when the traverser main bodies are located at the corresponding cut-off portions, connected substantially with the corresponding conveyor rails to receive the associated runners from the corresponding conveyor rails; and a drop lifter arranged below the traverser and adjacent to the main body line for simultaneously receiving the panel components from the runner, which have been transported by the traverser, and lowering and feeding the body components to a predetermined position in the main body assembly line.

9. The work conveyor of claim 8, wherein the panel component conveyor in each of the panel component production lines has a horizontal guide rail extending in a flowing direction of the panel component production line; a plurality of pallets movably supported on the horizontal guide rail, each of said pallets being provided with locators for mounting on the associated pallet each panel component produced in the corresponding panel component production line; and a shuttle member disposed in engagement with each of the pallets to successively move the pallet through the plural work stations arranged in the corresponding panel component production line.

10. The work conveyor of claim 8, wherein each vertical lifter has a column supported at a lower end thereof on a floor and extending upwardly; a lift member disposed for vertical movement on the column; lifting means connected to the lift member and arranged on an upper end portion of the column for vertically moving the lift member; a movable frame provided on and extending from the lift member and defining in a horizontal plane thereof a space corresponding in shape and dimensions to the panel components; and a plurality of cylinder means arranged on the movable frame so that each of said cylinder means is directed toward an interior of the space and can be driven between an operated position where said cylinder means supports the panel component and a non-operated position where said cylinder means is prevented from interfering with the panel component.

11. The work conveyor of claim 8, wherein:

the conveyor rails of the trolley conveyor are each constructed of a stationary frame secured on a structural ceiling member of a plant building, a rail main body provided on the stationary frame, and the plural insulated trolley lines arranged longitudinally on the rail main body, said insulated trolley lines including power lines for feeding electric power to each of the runners and control lines for transmitting the running control signals to each of the runners; and the insulated trolley lines are provided on the rail main body such that the insulated trolley lines are independent from one section to another arranged over predetermined lengths along the length of the rail main body.

* * * * *